(12) United States Patent
Obayashi et al.

(10) Patent No.: US 7,398,724 B2
(45) Date of Patent: Jul. 15, 2008

(54) SUPPORT STRUCTURE CARRYING THRUST LOAD OF COMPRESSOR AND THRUST NEEDLE ROLLER BEARING

(75) Inventors: Kousuke Obayashi, Iwata (JP); Tetsuya Hayashi, Iwata (JP); Shinji Oishi, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/702,641

(22) Filed: Nov. 7, 2003

(65) Prior Publication Data

US 2004/0094030 A1    May 20, 2004

(30) Foreign Application Priority Data

Nov. 7, 2002    (JP) .............................. 2002-324049

(51) Int. Cl.
*F01B 3/00* (2006.01)
*F16C 33/46* (2006.01)

(52) U.S. Cl. ......................................... 92/71; 384/525

(58) Field of Classification Search ................ 92/71; 384/565

See application file for complete search history.

(56) References Cited

U.S. PATENT DOCUMENTS

| | | | |
|---|---|---|---|
| 1,380,622 A | 6/1921 | Winn | |
| 3,913,994 A * | 10/1975 | Alling et al. | 384/623 |
| 4,042,309 A | 8/1977 | Hiraga | |
| 4,045,100 A * | 8/1977 | Beauchet | 384/461 |
| 5,094,590 A | 3/1992 | Carella et al. | |
| 5,233,913 A | 8/1993 | Muirhead | |
| 6,619,850 B1 * | 9/2003 | Kenney | 384/623 |
| 2003/0063829 A1 * | 4/2003 | Tamada et al. | 384/621 |
| 2003/0198420 A1 * | 10/2003 | Matsuyama et al. | 384/565 |

FOREIGN PATENT DOCUMENTS

| | | |
|---|---|---|
| DE | 12 10 681 B | 2/1966 |
| DE | 31 34 625 A1 | 4/1983 |
| EP | 1 298 334 A2 | 4/2003 |
| GB | 444 292 A | 3/1936 |
| JP | 10-259821 | 9/1998 |
| JP | 11-351245 | 12/1999 |
| JP | 2002-70872 A | 3/2002 |

* cited by examiner

*Primary Examiner*—F. Daniel Lopez
(74) *Attorney, Agent, or Firm*—McDermott Will & Emery LLP

(57) ABSTRACT

A support structure carrying a thrust load of a compressor has a swash plate which contributes to a compressing operation by rotating according to rotation of a rotating shaft which is rotatably supported by a housing. The swash plate is rotatably supported with respect to the housing, and the support structure includes a thrust needle roller bearing having double-row needle rollers. The support structure carrying a thrust load of a compressor and the thrust needle roller bearing are thus obtained, with an improvement in inflow and outflow of a lubricating oil, a reduction of the differential slip of the needle rollers, and an improvement in strength durability.

9 Claims, 12 Drawing Sheets

2a,2b 2a,2b

SUPPORT STRUCTURE CARRYING THRUST LOAD OF COMPRESSOR AND THRUST NEEDLE ROLLER BEARING

BACKGROUND OF THE INVENTION

1. Field of the Invention

The present invention relates to a support structure which carries a thrust load of a compressor as well as a thrust needle roller bearing.

2. Description of the Background Art

A thrust needle roller bearing is constituted of needle rollers, a cage and a race, and is structured to allow the needle rollers to be in line contact with the race. Therefore, despite of a small bearing area, this type of bearing is advantageous because of its high load capacity and high stiffness. The thrust needle roller bearing is thus suitable for use under hostile conditions, for example, during a drive under conditions like scarce lubrication and high-velocity rotation, and is accordingly used as a support structure carrying a thrust load of a compressor for an air conditioner of an automobile.

A conventional thrust needle roller bearing is known from Japanese Patent Laying-Open No. 2002-70872 according to which at least one of the inflow and the outflow of a lubricating oil is improved or promoted so as to increase the amount of the lubricating oil which passes through the bearing per unit time. This thrust needle roller bearing is described below in connection with FIGS. 13A-13C.

As shown in FIGS. 13A-13C, this thrust needle roller bearing 50 has a plurality of needle rollers 80 and two annular cages 60 and 70. These two cages 60 and 70 respectively have a plurality of windows 61 and 71 having a length in the radial direction longer than that of the rollers. Roller holder portions 64 and 74 formed at these windows 61 and 71 hold needle rollers 80 therebetween from above and below. The radial length 1a of roller holder portions 64 and 74 of two cages 60 and 70 is made smaller than the length 1 of the rollers. At least one of two cages 60 and 70 is bent so that at least one of the thicknesses t1 and t2 is smaller than the thickness t0 in the direction perpendicular to the radial direction as seen in FIG. 13B (hereinafter referred to as perpendicular direction). Here, thicknesses t1 and t2 refer to respective thicknesses of portions of cages 60 and 70 that are located respectively outside and inside in the radial direction with respect to roller holder portions 64 and 74, and the thickness t0 refers to the thickness of roller holder portions 64 and 74 in the perpendicular direction.

Outer plate-like portions 62 and 72 of two cages 60 and 70 are laid on each other in the perpendicular direction while the innermost parts 67 and 77 respectively of inner plate-like portions 63 and 73 are bent in the perpendicular direction to be laid on each other. The innermost part 67 of inner plate-like portion 63 is caulked and thereby fixed.

In this way, on at least one of radially outer portions 62 and 72 and radially inner portions 63 and 73 that are smaller in thickness than roller holder portions 64 and 74, the inflow or outflow of the lubricating oil can be improved or promoted to increase the amount of the lubricating oil passing through the bearing per unit time. Moreover, since the passage of the lubricating oil is less prone to be blocked by cages 60 and 70, the lubricating oil does not stay in the bearing. Thus, any increase of the oil temperature can be avoided and the durability of the bearing can be improved.

The compressor for a car air-conditioner uses an oil having a low viscosity and the amount of the oil is small for enhancing the ability of the compressor as well as the cooling ability. Under hostile conditions like such scarce lubrication, the conventional single-row thrust roller bearing shown for example in FIGS. 13A-13C causes the following problems when used for the compressor for the car air-conditioner.

The conventional thrust needle roller bearing 50 shown in FIGS. 13A-13C is structured to allow needle rollers 80 to be in line contact with the race and thus the raceway surface is in rolling line contact with needle rollers 80. Accordingly, the circumferential velocity is higher at a radially outer part of the raceway surface relative to the circumferential velocity at the center of rotation of the bearing. Then, there is a difference in circumferential velocity between the raceway surface and the roller. A maximum difference in circumferential velocity arises, between the difference in circumferential velocity between the raceway surface and the roller at the inner end of the roller and the difference in circumferential velocity therebetween at the outer end of the roller. This difference is greater as the roller is longer with respect to the outer diameter of the roller, resulting in a greater differential slip (skew of the roller). The occurrence of the differential slip causes breakage of an oil film and consequently metal-to-metal contact. Then, the metal-to-metal contact portion generates heat and thereby surface damage (smearing) as well as surface-originated peeling are likely to occur, particularly when the rotational speed is higher. In addition, it is often seen that the lifetime becomes shorter due to the above factors.

Some thrust needle roller bearings are structured so that the cage and the race are in sliding contact with each other. In such a case, the cage blocks flow of a lubricating oil to resist the flow thereof to an area where needle rollers and the race are in rolling contact with each other. Under scarce lubrication, it is especially necessary that the oil flows to the rolling surface of the needle rollers. If the amount of the oil is scarce, metal-to-metal contact between the needle rollers and the race occurs, possibly resulting in surface damage at an earlier stage.

Box-shaped cages 60 and 70 of the conventional thrust needle roller bearing 50 block flow of the lubricant to needle rollers 80 and thus the surface damage at an earlier stage mentioned above is likely to occur. Further, although two cages 60 and 70 are attached to each other and the periphery thereof is caulked, this manner of caulking could cause two cages 60 and 70 to separate from each other.

SUMMARY OF THE INVENTION

The present invention has been made in view of the above-discussed circumstances and an object of the present invention is to provide a support structure which carries a thrust load of a compressor as well as a thrust needle roller bearing, with an improvement of the inflow and outflow of a lubricating oil, a reduction of the differential slip of needle rollers, and an improvement of the strength durability.

According to one aspect of the present invention, a support structure carrying a thrust load of a compressor has a compression-contributing member contributing to a compressing operation by rotating according to rotation of a rotating shaft which is supported rotatably by a housing. The support structure rotatably supports the compression-contributing member with respect to the housing and includes a thrust needle roller bearing having double-row needle rollers.

According to another aspect of the present invention, a support structure carrying a thrust load of a compressor has a compression-contributing member contributing to a compressing operation by rotating according to rotation of a rotating shaft which is supported rotatably by a housing. The support structure includes a thrust needle roller bearing having double-row needle rollers between the housing and a sleeve of the rotating shaft.

Regarding the support structure according to the one and another aspects of the present invention that carries a thrust load of a compressor, the thrust needle roller bearing has needle rollers arranged in two rows, so that the length in the radial direction of one needle roller can be shortened as compared with that of a single-row needle roller. Accordingly, the differential slip of the needle rollers can be reduced and thus breakage of an oil film and metal-to-metal contact can be avoided. Then, a reduction of the heat generation of the support structure as well as high-speed rotation are achieved. Consequently, any surface damage and surface-originated peeling can be prevented to improve the durability of the bearing. Moreover, as the differential slip can be reduced, the support structure has a low torque and thereby a high energy efficiency can be achieved. In this way, the support structure carrying a thrust load of a compressor can be obtained with an improved strength durability.

Preferably, the compression-contributing member of the above-described support structure carrying a thrust load of a compressor is a swash plate having an inclined surface with respect to a surface in the direction orthogonal to the axial direction of the rotating shaft.

The inclined surface of the swash plate can thus be used to readily cause a piston action of a piston in a cylinder.

Preferably, the thrust needle roller bearing of the above-described support structure carrying a thrust load of a compressor has a plurality of needle rollers and two annular cages. The two cages respectively have a plurality of pockets having a radial length slightly larger than that of the needle rollers. Roller holder portions that are formed at the pockets respectively are structured to allow the two cages to hold the needle rollers therebetween in the direction from above and below and thereby carry a thrust load of a compressor, and needle rollers are arranged in two rows in each of the pockets.

In this way, the compressor having the double-row thrust needle roller bearing can be implemented with a simple structure.

Preferably, the needle rollers of the support structure carrying a thrust load of a compressor each have an end-surface shape represented by symbol A, symbol F or a combination of those represented by symbols A and F defined by JIS.

Thus, the shape of the end surface of the needle roller can appropriately be selected.

Preferably, regarding the above-described support structure carrying a thrust load of a compressor, one of the double-row needle rollers that is located on the radially outer side has its length which is at least the length of the needle roller located on the radially inner side.

The radially outer needle roller thus has its length larger than that of the radially inner needle roller so that the load capacity on the radially outer side can appropriately be increased to a desired load capacity.

Preferably, regarding the support structure carrying a thrust load of a compressor, the roller holder portion has its corner smoothly rounded.

Thus, the needle rollers can stably be guided and held without breakage of a lubricating-oil film formed on the surface of the needle rollers.

Preferably, regarding the support structure carrying a thrust load of a compressor, one of the two cages is caulked to be fixed to the other cage on at least one of the radially outermost end and the radially innermost end of the two cages.

In this way, the two cages can surely be fixed by the caulking so that separation of needle rollers from the cages, due to separation of the two cages, can be prevented. Here, the portion to be caulked may appropriately be selected from one of the radially outer side and radially inner side of the cages and both of the radially outer and inner sides.

Preferably, regarding the support structure carrying a thrust load of a compressor, the two cages are caulked on both of the radially outermost end and the radially innermost end of the two cages, and a flat portion having a cross-sectional height lower than that of the roller holder portions is provided between a caulked portion produced by the caulking and respective ends of the needle rollers.

In this way, the radially inner part and the radially outer part of the two cages are caulked, the flat portion having the cross-sectional height lower than that of the roller holder portions is provided between the caulked portion and respective ends of the needle rollers, and accordingly not only the outflow of the lubricating oil but the inflow of the lubricating oil can be improved. Then, seizure of any part of the bearing can surely be prevented and drilling wear of an end surface of a needle roller and a pocket of the cage can be reduced. Further, as it hardly occurs that the cages block passage of the lubricating oil, the lubricating oil is unlikely to stay so that any increase of the oil temperature can be reduced. Accordingly, together with an increase in strength of the cages that is achieved by fixing both of the radially outermost end and the radially innermost end of the two cages, a further improvement of the durability of the bearing can be achieved.

Preferably, regarding the support structure carrying a thrust load of a compressor, one of the two cages is bent into C-shape to be caulked to the other cage on at least one of the radially outermost end and the radially innermost end of the two cages.

This caulking can be done to prevent the two cages from separating from each other.

Preferably, regarding the support structure carrying a thrust load of a compressor, the two cages are welded on at least one of the radially outermost end and the radially innermost end of the two cages.

This welding can be done to surely fix the two cages and further prevent deformation of the cages in assembly.

Preferably, regarding the support structure carrying a thrust load of a compressor, the two cages are laid on each other to be in contact with each other at a portion where they contact an end surface of the needle roller.

Thus, drilling wear of the pockets of the cages due to the end surfaces of the needle rollers can be reduced.

Preferably, regarding the support structure carrying a thrust load of a compressor, the two cages are caulked to be fixed on both of the radially outermost end and the radially innermost end of the cages, one of the two cages is bent for caulking on the outermost end and the other of the two cages is bent for caulking on the innermost end.

Preferably, regarding the support structure carrying a thrust load of a compressor, the two cages are caulked to be fixed on both of the radially outermost end and the radially innermost end of the cages, and one of the two cages is bent for caulking on both of the outermost end and the innermost end.

The bent portions for caulking may be bent in the same direction or in different directions on both of the outermost end and the innermost end.

Preferably, regarding the support structure carrying a thrust load of a compressor, the two cages are caulked along the entire circumferential periphery of the cages.

In this way, the two cages can firmly be integrated into one unit.

Preferably, regarding the support structure carrying a thrust load of a compressor, the two cages are partially caulked at a plurality of portions in the circumferential direction.

Thus, as compared with the caulking of the two cages along the entire periphery, the caulking process can be simplified and deformation of the cages in the caulking process can be reduced. Preferably, the caulked portions on the radially outermost end and the radially innermost end of the two cages may be placed at regular intervals in the circumferential direction with a phase difference between the caulked portions, so that the deformation of the cages can further be reduced.

Preferably, regarding the support structure carrying a thrust load of a compressor, the two cages each have an alignment part for positioning one of the two cages with respect to the other cage and for preventing displacement of the other cage from the one cage.

The positioning of the two cages in assembly can thus be facilitated and displacement of one of the two cages from the other thereof after assembly can be prevented.

Preferably, regarding the support structure carrying a thrust load of a compressor, the two cages are of a material containing resin.

Thus, metal-to-metal contact between the needle rollers and the cages can be prevented.

According to a method of manufacturing a support structure carrying a thrust load of a compressor in accordance with one aspect of the present invention, two cages and needle rollers are assembled so that the cages hold the needle rollers therebetween in the direction from above and below by roller holder portions formed respectively at a plurality of pockets, one of the two cages is caulked to the other cage, and thereafter the two cages and the needle rollers are carburized, quenched and tempered. The needle rollers may be quenched and tempered in advance.

The above-described method does not require annealing of the caulked portion so that the cages having a high strength (high hardness) and a large depth of a hardened layer can be produced at a low cost.

According to a method of manufacturing a support structure carrying a thrust load of a compressor in accordance with another aspect of the present invention, two cages and needle rollers are each quenched and tempered, thereafter they are assembled so that the cages hold the needle rollers therebetween in the direction from above and below by roller holder portions formed respectively at a plurality of pockets, and one of the two cages is caulked to the other cage.

According to the above-described method, different heat treatments can be performed respectively on the two cages and needle rollers. For example, each of the two cages can be carburized, quenched, tempered, and soft-nitrided.

Preferably, according to the method of manufacturing the support structure carrying a thrust load of a compressor in accordance with the one or another aspect of the present invention, the two cages are each produced by shaving or press working.

Thus the two cages each can appropriately be formed by shaving or press working.

A thrust needle roller bearing according to the present invention is used for the above-described support structure carrying a thrust load of a compressor.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described in detail in connection with the drawings.

First Embodiment

Figure 1:
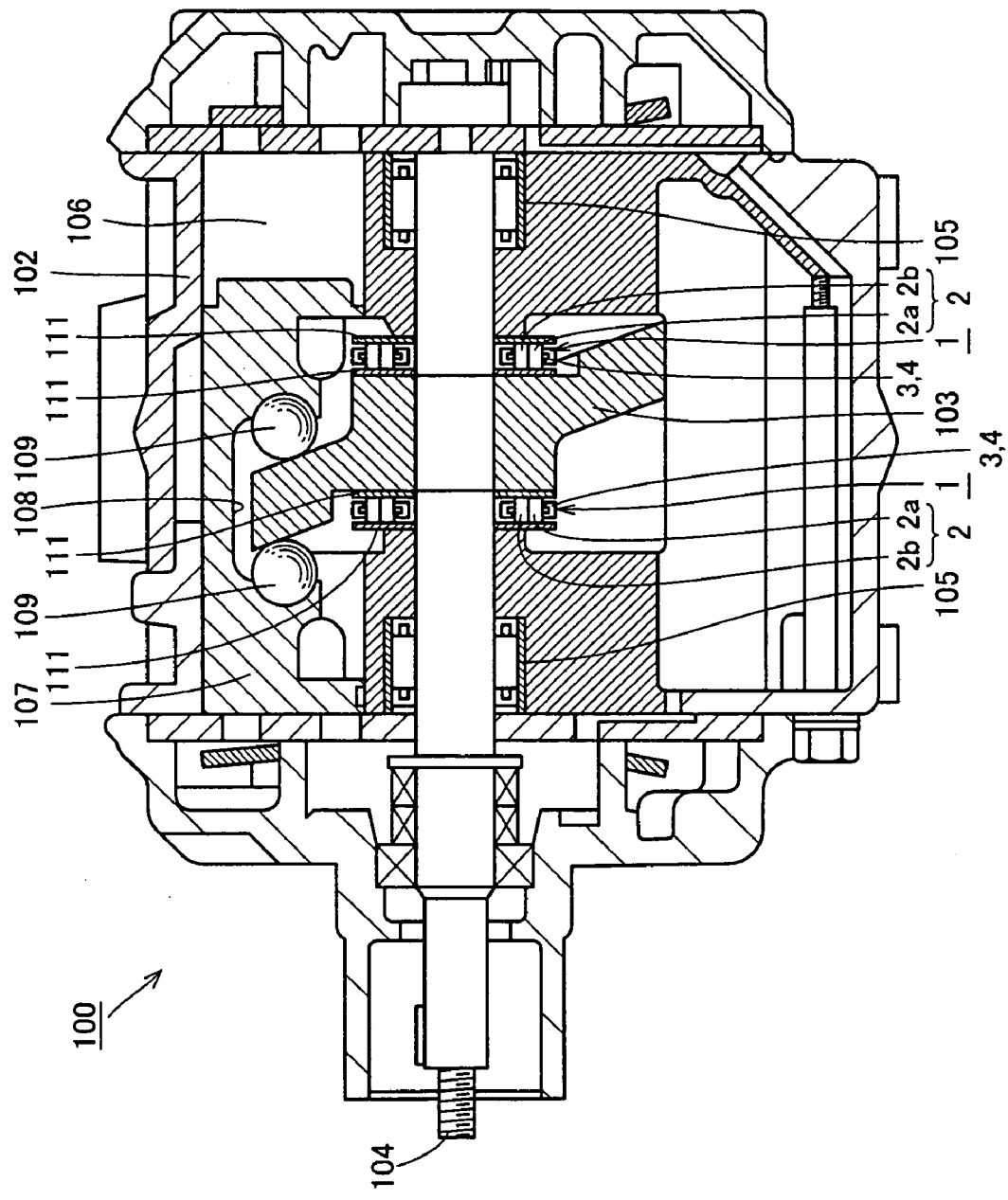
FIG. 1 is a schematic cross-sectional view showing a support structure which carries a thrust load of a compressor according to a first embodiment of the present invention.

Referring to FIG. 1, a compressor, for example, a swash-plate compressor 100 of double-swash-plate type is shown. Swash-plate compressor 100 has a swash plate 103 secured to a main shaft 104 and the swash plate rotates to reciprocate a piston 107 via shoes 109 sliding on swash plate 103.

Main shaft 104 to which swash plate 103 is secured is rotatably supported via a radial bearing 105 in a housing 102. Housing 102 has a plurality of cylinder bores 106 formed therein that are arranged at regular intervals in the circumferential direction, and double-headed piston 107 is sidably held in each bore 106. A depression 108 is formed at a central part of each piston 107 to surround the outer periphery of swash plate 103, and spherical or hemispherical shoes 109 are placed on respective spherical seats that are formed in depression 108 on its surfaces opposite to each other in the axial direction. Shoes 109 placed between swash plate 103 and piston 107 serve to smoothly convert rotations of swash plate 103 into the reciprocation of piston 107.

Swash plate 103 secured to main shaft 104 accordingly rotates together with main shaft 104. As discussed above, swash plate 103 serves to reciprocate piston 107 and thus a thrust load is generated in the axial direction of main shaft 104. Therefore, a thrust needle roller bearing 1 is employed as a support structure carrying the thrust load. This thrust needle roller bearing 1 has needle rollers 2, two cages 3 and 4 and a pair of races 111, 111. One of the paired races 111 is attached to swash plate 103 while the other race 111 is attached to housing 102.

Thrust needle roller bearing 1 described above has needle rollers 2 that include needle rollers 2a and 2b arranged in two rows.

This thrust needle roller bearing 1 has its structure as specifically described below.

Referring to FIGS. 2A-2E and FIG. 3, thrust needle roller bearing 1 has a plurality of needle rollers 2 and two annular cages 3 and 4 that hold these needle rollers 2 at predetermined pitches in the circumferential direction. Two cages 3 and 4 respectively have a plurality of rectangular pockets 5 and 6 with the length in the radial direction larger than the length L of needle rollers 2, and are formed by pressing of a steel plate which is for example a cold-rolled steel plate (SPCC). Roller holder portions 5a and 6a are formed respectively on opposite sides of pockets 5 and 6 to extend toward and face each other. Needle rollers 2 are thus held by roller holder portions 5a and 6a therebetween in the direction from above and below. Instead of cages 3 and 4 as described above, any cages produced through draw-forming of a band steel by means of a press or through shaving may be used.

Needle rollers 2 include needle rollers 2a on the radially outer side and needle rollers 2b on the radially inner side, and are arranged in two rows in pockets 5 and 6. The double-row arrangement reduces a difference in circumferential velocity of revolution between the radially outer part and the radially inner part, and thereby the differential slip between the rollers and the raceway surface (not shown) is reduced. Then, less heat is generated from the contact portion and the surface damage (smearing) can be prevented.

Here, respective lengths L1 and L2 of double-row needle rollers 2a and 2b are equal to each other. These lengths, however, may be selected to satisfy a relation, L2 (length of the radially inner roller)≦L1 (length of the radially outer roller) or L1≦L2 depending on conditions in use. Preferably, the length of radially outer needle roller 2a is longer, for example, 1.2 times as long as the length of radially inner needle roller 2b so that the load capacity on the radially outer part is increased.

Figure 2A:
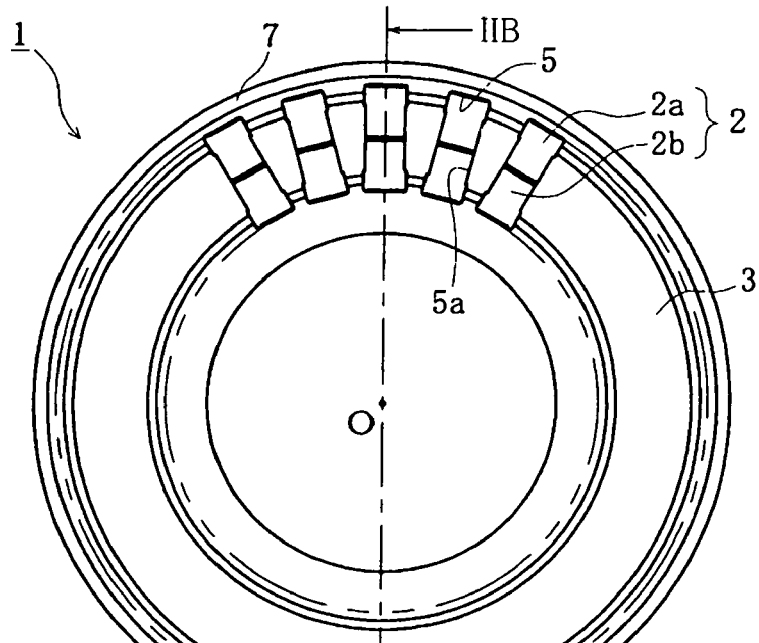
FIG. 2A is a plan view showing a thrust needle roller bearing which is a support structure carrying a thrust load of the compressor according to the first embodiment of the present invention.
Figure 2B:
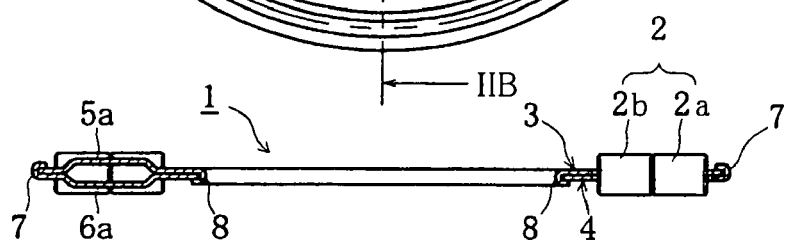
FIG. 2B is a cross-sectional view along line IIB-IIB in FIG. 2A.
Figure 2C:
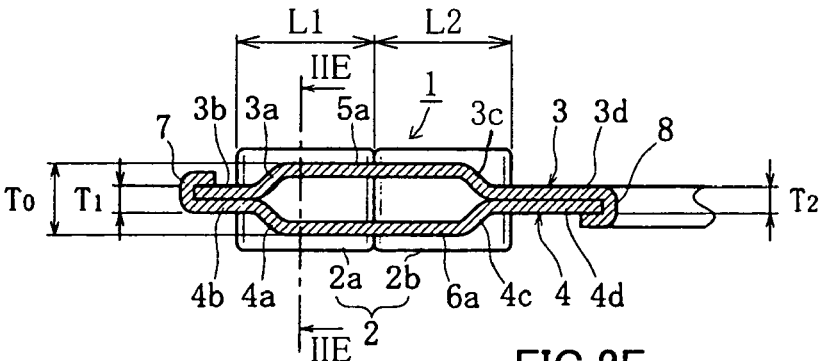
FIG. 2C is an enlarged view of an essential part shown in FIG. 2B.
Figure 2D:
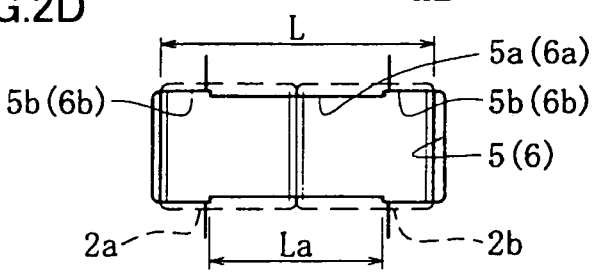
FIG. 2D is an enlarged view of an essential part shown in FIG. 2A.

As shown in FIG. 2D, the length La in the radial direction of roller holder portions 5a and 6a can be made smaller than the length L of needle rollers so that a lubricating oil can readily pass between needle rollers 2 and cages 3 and 4 through depressions 5b and 6b formed on both ends of roller holder portions 5a and 6a.

Figure 2E:
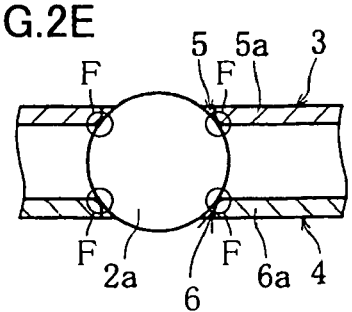
FIG. 2E is an enlarged cross-sectional view along line IIE-IIE in FIG. 2C.
Figure 3:
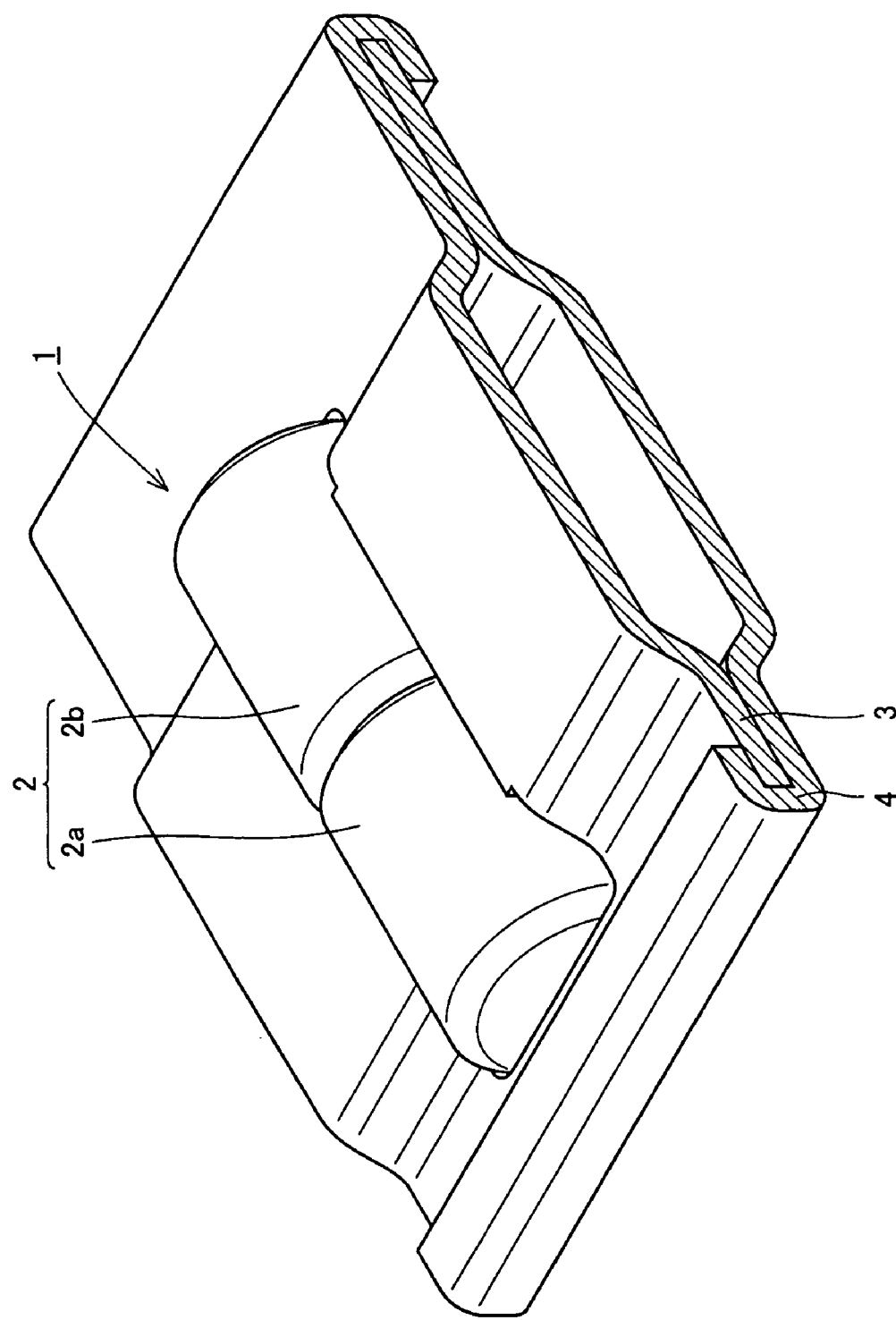
FIG. 3 is a partially cross-sectional perspective view showing, in an enlarged form, a part of the thrust needle roller bearing in FIGS. 2A-2E.

Further, as shown in FIG. 2E, respective corners (F) of roller holder portions 5a and 6a may be rounded when pockets 5 and 6 are punched by a press, or may be rounded to become smooth through surface-pressing of the inner rim after the punching. In this way, without breaking a lubricating-oil film formed on the surfaces of needle rollers 2a and 2b, needle rollers 2a and 2b can stably be guided and held. Here, the corners are "rounded" so that the sharp edges of the corners are removed to become round.

Of two cages 3 and 4, upper cage 3 has its roller holder portion 5a with its radially outer portion including a sloping extension 3a formed by bending the outer end of roller holder portion 5a and an outer plate-like portion 3b formed by bending the lower end of sloping extension 3a in the radial direction. Roller holder portion 5a of cage 3 also has its radially inner portion including a sloping extension 3c formed by bending the inner end of roller holder portion 5a and an inner plate-like portion 3d formed by bending the lower end of sloping extension 3c in the radial direction.

Lower cage 4 with the pockets punched with the same die as that for upper cage 3 has roller holder portion 6a with its radially outer portion including a sloping extension 4a formed by bending the outer end of roller holder portion 6a and an outer plate-like portion 4b formed by bending the outer end of sloping extension 4a. Roller holder portion 6a of lower cage 4 has its radially inner portion including a sloping extension 4c formed by bending the inner end of roller holder portion 6a and an inner plate-like portion 4d formed by bending the inner end of sloping extension 4c.

Respective outer plate-like portions 3b and 4b of two cages 3 and 4 are laid on each other so that these plates are in contact with each other in the direction perpendicular to the radial direction as seen in FIG. 2C (herein referred to as perpendicular direction). The outermost part of outer plate-like portion 4b is bent upward into C-shape so that outer plate-like portion 4b is caulked to outer plate-like portion 3b to form a caulked portion 7. Inner plate-like portions 3d and 4d are also laid on each other so that these plates are in contact with each other in the perpendicular direction. The innermost part of inner plate-like portion 3d is bent downward into C-shape so that inner plate-like portion 3d is caulked to inner plate-like portion 4d to form a caulked portion 8. Caulked portions 7 and 8 are provided along the entire outermost and innermost edges of two cages 3 and 4.

Two cages 3 and 4 are thus firmly integrated into a unit by caulking of the outermost and innermost edges with caulked portions 7 and 8. Therefore, two cages 3 and 4 are never separated from each other during a drive. Moreover, a large area of contact between the end surfaces of needle rollers 2 and pockets 5 and 6 is secured in regions of outer plate-like portions 3b and 4b and inner plate-like portions 3d and 4d so that drilling wear can be reduced.

When two cages 3 and 4 are fixed, a thickness $T_1$, in the perpendicular direction, of the radially outer part of the cages and a thickness $T_2$, in the perpendicular direction, of the radially inner part thereof are smaller than a thickness $T_0$ in the perpendicular direction of roller holder portions 5a and 6a of two cages 3 and 4, because of the presence of sloping extensions 3a, 4a, 3c and 4c. In other words, between caulked portions 7 and 8 and corresponding ends of needle rollers 2, there are provided flat portions (outer plate-like portions 3b and 4b and inner plate-like portions 3d and 4d) having a cross-sectional height smaller than that of roller holder portions 5a and 6a.

Figure 4:
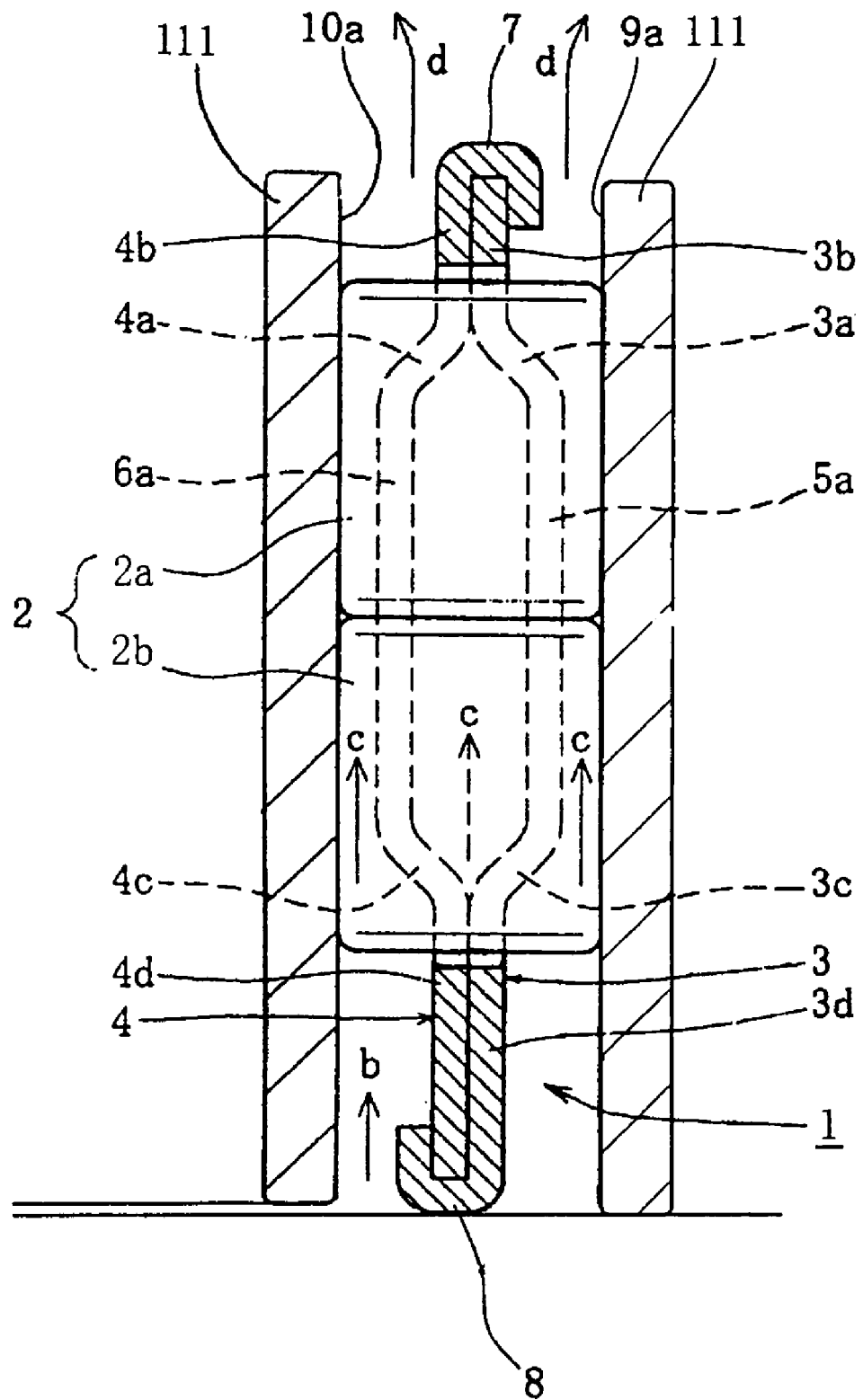
FIG. 4 is an enlarged view of the thrust needle roller bearing and therearound shown in FIG. 1.

As shown in FIG. 4, thrust needle roller bearing 1 structured as discussed above is clearance fit by using caulked portion 8 of upper cage 3 as a guide surface, so that needle rollers 2 roll between a raceway surface 10a of race 111 attached to the housing and raceway surface 9a of race 111 attached to the swash plate. As swash-plate-attached race 111 rotates, cages 3 and 4 accordingly rotate with race 111 so that needle rollers 2 roll between raceway surfaces 9*a* and 10*a*. Here, a lubricating oil is supplied from a hydraulic source (not shown) through an oil path into thrust needle roller bearing 1.

The lubricating oil is supplied from the radially inner side of thrust needle roller bearing 1 as indicated by arrow b, thereafter passed through a space formed by the outer surfaces of needle rollers 2 and cages 3 and 4 as indicated by arrow c, lubricates the portions between the side surfaces of needle rollers 2 and roller holder portions 5*a* and 6*a* of cages 3 and 4, between end surfaces of needle rollers 2 and cages 3 and 4, and between the side surfaces of needle rollers 2 and raceway surfaces 9*a* and 10*a*, and is then discharged as indicated by arrow d through the portion between raceway surface 10*a* and the radially outer portion of cage 4 with respect to roller holder portion 6*a* and through the portion between raceway surface 9*a* and the radially outer portion of cage 3 with respect to roller holder portion 5*a*.

Regarding the lubrication of the above-described portions by the lubricating oil, since the perpendicular thicknesses T1 and T2 of the radially outer and inner portions of roller holder portions 5*a* and 6*a* of two cages 3 and 4 are made smaller than the perpendicular thickness To of roller holder portions 5*a* and 6*a* (see FIG. 2C) and accordingly the cross-sectional area of the space formed between raceway surface 10*a* and the radially inner portion of lower cage 4 with respect to roller holder portion 6*a* is larger than conventional ones, not only the outflow of the lubricating oil but also the inflow of the lubricating oil is enhanced. Seizure of any part of the bearing can surely be prevented and drilling wear of the end surfaces of needle rollers 2 and pockets 5 and 6 of cages 3 and 4 can be reduced. Moreover, since the lubricating oil is less prone to be hindered from passing by cages 3 and 4, the lubricating oil hardly stays. Then, any increase of the oil temperature can be reduced, the strength of the cages is increased and the durability of the bearing can further be improved.

A procedure for manufacturing the above-described thrust needle roller bearing 1 is detailed below.

Figure 5:
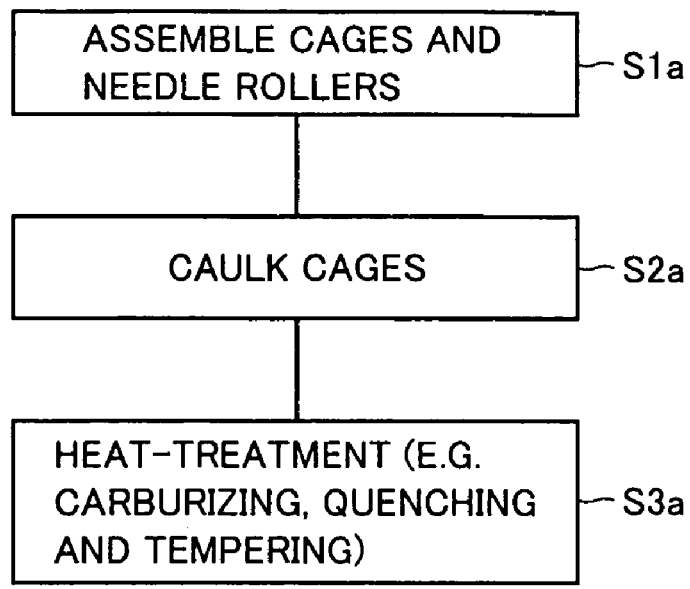
FIG. 5 shows a procedure for manufacturing the thrust needle roller bearing shown in FIGS. 2A-2E, 3 and 4.

Referring to FIG. 5, two cages 3 and 4 and needle rollers 2 that have been quenched and tempered or have not been quenched are set. Specifically, the cages and needle rollers are assembled in such a manner that roller holder portions 5*a* and 6*a* formed respectively at pockets 5 and 6 of two cages 3 and 4 hold needle rollers 2 therebetween in the direction from above and below (step S1*a*). Then, the outermost part of outer plate-like portion 4*b* is bent upward into C-shape to form caulked portion 7 while the innermost part of inner plate-like portion 3*d* is bent downward into C-shape to form caulked portion 8, and accordingly two cages 3 and 4 are integrated into a unit and fixed (step S2*a*). Here, needle rollers 2 are made of, for example, a SUJ bearing steel which is a high carbon chromium bearing steel of type 1 or type 2, and the steel is oil-quenched at a temperature of 840° C. for 30 minutes and then tempered at a temperature of 180° C. for 90 minutes to adjust the surface hardness to approximately 700-750 by Vickers hardness (Hv).

After this, with needle rollers 2 and two cages 3 and 4 being set as described above, they are heat-treated (e.g. carburized, quenched and tempered or quenched and tempered after carbonitrided) (step S3*a*). A thrust needle roller bearing is thus produced. In this case, the carburization is done, for example, by carburization for example at a temperature of 850° C. for 35 minutes (in RX gas atmosphere), quenching in oil or cooling gas, and then tempering at a temperature of 165° C. for 60 minutes. The carbonitriding is done, for example, by carbonitriding in a carbonitriding atmosphere (1-3% by volume of ammonia is added to the RX gas) at a temperature of 840-850° C. for 35 minutes and subsequent quick cooling in oil or cooling gas.

Here, two cages 3 and 4 may be improved in strength by being soft-nitrided in advance at a temperature of 570-580° C. for 35 minutes. No preliminary heat-treatment may be performed on needle rollers 2. However, if needle rollers 2 are subjected to heat treatment or through quenching in advance before being assembled, an advantage is obtained that the strength is further improved by the subsequent carburizing or carbonitriding while a disadvantage of an increase of the manufacturing steps is accompanied. At any rate, as compared with conventionally employed processes in which two cages 3 and 4 and needle rollers 2 are separately heat-treated and the caulked portions are annealed, the manufacturing process is simplified.

Figure 6:
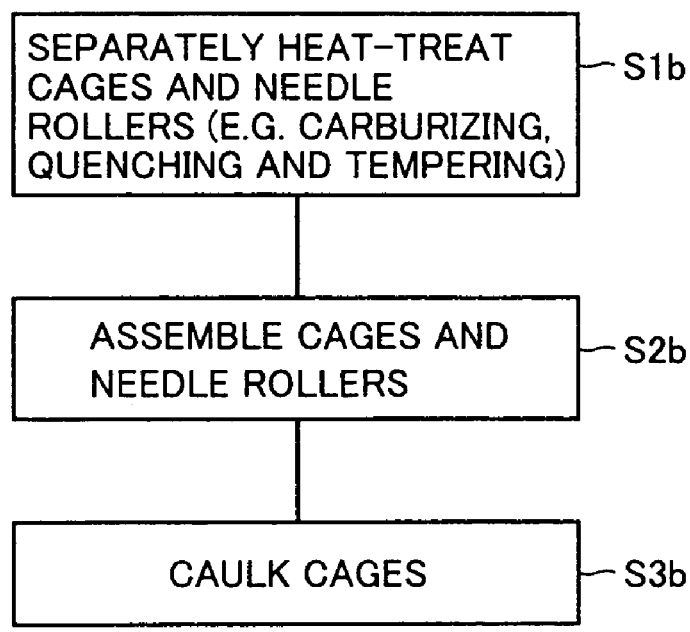
FIG. 6 shows another procedure for manufacturing the thrust needle roller bearing shown in FIGS. 2A-2E, 3 and 4.

If the soft-nitriding of cages 3 and 4 is done, the process shown in FIG. 6 may be used. Namely, cages 3 and 4 and needle rollers 2 are separately heat-treated (e.g. carburized, quenched and tempered or carbonitrided and then quenched and tempered) (step S1*b*), cages 3 and 4 and needle rollers 2 are set (step S2*b*) and thereafter cages 3 and 4 are caulked (step S3*b*).

Thrust needle roller bearing 1 which is manufactured through the above-describe procedure can offer specific characteristics that are described in detail below.

With regard to needle rollers 2, the surface layer thereof is a carburized or carbonitrided layer and thus the hardness of the surface layer is higher than that of conventional ones. Therefore, even if high-hardness foreign matters are caught in rollers, indentations are hardly made, which contributes to extension of the lifetime. In the carbonitriding process, a nitrogen-rich layer is formed and such a large amount of retained austenite as 20% by volume can be obtained. This feature contributes to an increase of the hardness as well as an extension of the lifetime since the large amount of retained austenite plastically deforms to alleviate stress concentration, which occurs in conventional bearings when a high-hardness foreign matter is caught between raceway surfaces 9*a* and 10*a* that leaves an indentation resulting in a source of stress concentration around the indentation. Here, the nitrogen-rich layer may specifically be at least 0.1 mm in thickness and at least 750 Hv in surface hardness. Moreover, the internal hardness can be increased to be almost equal to the surface hardness so that the strength of the entire needle rollers can be improved. Accordingly, when used under harsh conditions, for example, heavy load, the product of the present invention can sufficiently endure the load and satisfy a desired lifetime.

With regard to cages 3 and 4, as needle rollers 2, the surface layer of the cages is a carburized layer or carbonitrided layer, and a surface hardness of at least 400 Hv, or at least 600 Hv can be achieved depending on conditions of heat-treatment. The wear resistance can thus be enhanced as compared with conventional products.

Second Embodiment

A thrust needle roller bearing of this embodiment has its structure different from that of the first embodiment only in the shape of cages and caulking method. It is noted that the same or similar components or parts to those of the first embodiment are denoted by like reference characters and description thereof is not repeated here.

Figure 7A:
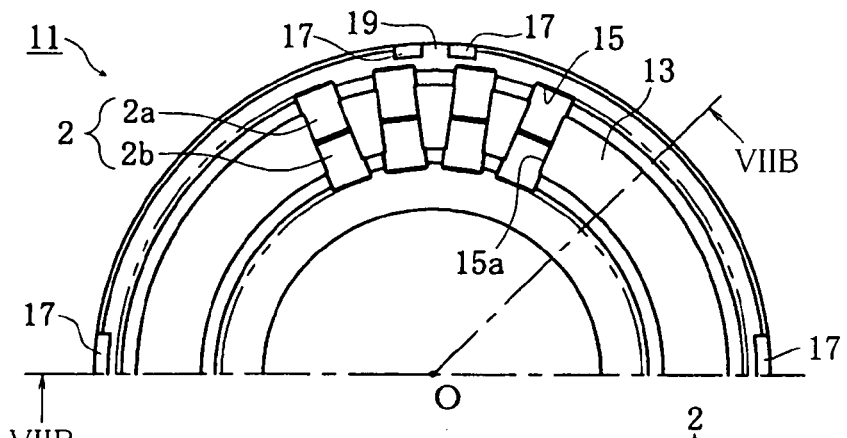
FIG. 7A is a plan view showing a support structure carrying a thrust load of a compressor according to a second embodiment of the present invention.
Figure 7B:
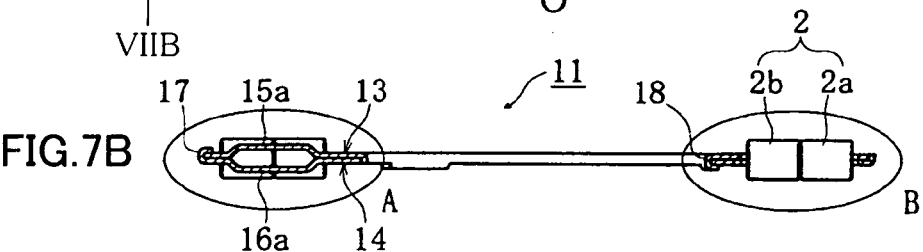
FIG. 7B is a cross-sectional view along line VIIB-O-VIIB in FIG. 7A.
Figure 7C:
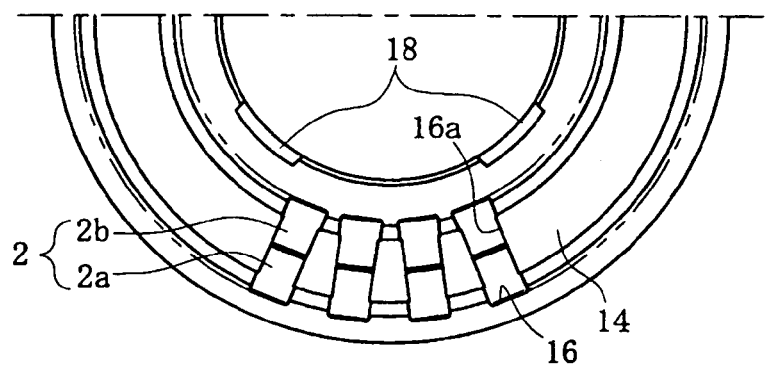
FIG. 7C is a bottom view of FIG. 7A.
Figure 7D:
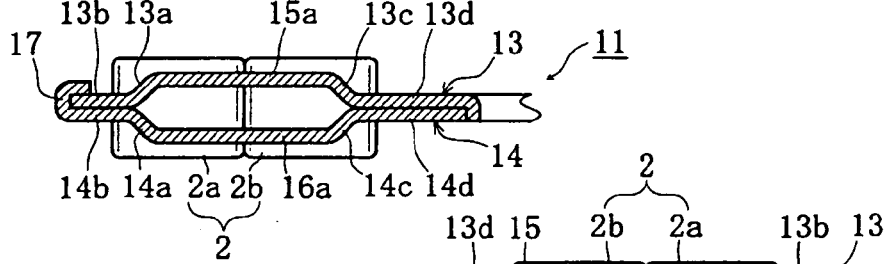
FIG. 7D is an enlarged view of a portion A in FIG. 7B.

Referring to FIGS. 7A-7E, thrust needle roller bearing 11 applied to a support structure which carries a thrust load of a compressor has a plurality of needle rollers 2 and two annular cages 13 and 14 that hold these needle rollers 2 at predetermined pitches in the circumferential direction. As shown in FIG. 7D, the upper one of two cages 13 and 14, namely upper cage 13, includes a roller holder portion 15a having its radially outer portion which includes a sloping extension 13a formed by bending the outer end of roller holder portion 15a and an outer plate-like portion 13b formed by bending the lower end of sloping extension 13a in the radial direction.

Roller holder portion 15a of upper cage 13 also has its radially inner portion which includes a sloping extension 13c formed by bending the inner end of roller holder portion 15a and an inner plate-like portion 13d formed by bending the lower end of sloping extension 13c in the radial direction.

Lower cage 14 with pockets punched with the same die as that for upper cage 13 has roller holder portion 16a with its radially outer portion including a sloping extension 14a formed by bending the outer end of roller holder portion 16a and an outer plate-like portion 14b formed by bending the outer end of sloping extension 14a in the radial direction. Roller holder portion 16a of lower cage 14 has its radially inner portion including a sloping extension 14c formed by bending the inner end of roller holder portion 16a and an inner plate-like portion 14d formed by bending the inner end of sloping extension 4c in the radial direction.

As shown in FIG. 7D, respective outer plate-like portions 13b and 14b of two cages 13 and 14 are laid on each other so that these plates are in contact with each other in the direction perpendicular to the radial direction (herein perpendicular direction). The outermost part of outer plate-like portion 14b is partially bent upward into C-shape so that outer plate-like portion 14b is caulked partially to outer plate-like portion 13b to form partially caulked portions 17. Inner plate-like portions 13d and 14d are also laid on each other so that these plates are in contact with each other in the perpendicular direction, and the innermost part of inner plate-like portion 13d is bent downward.

Figure 7E:
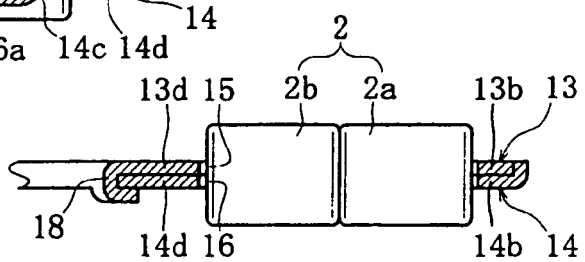
FIG. 7E is an enlarged view of a portion B in FIG. 7B.

Further, as shown in FIG. 7E, outer plate-like portions 13b and 14b are laid on each other so that they are in contact with each other in the perpendicular direction and the outermost part of outer plate-like portion 14b is bent upward. Inner plate-like portions 13d and 14d are laid on each other so that they are in contact with each other in the perpendicular direction and the innermost part of inner plate-like portion 13d is partially bent downward into C-shape so that inner plate-like portion 13d is partially caulked to inner plate-like portion 14d to form partially caulked portions 18. With these partially caulked portions 17 and 18, the inner and outer edges of two cages 13 and 14 are firmly integrated and, in this case, the manufacturing process can remarkably be simplified as compared with the caulking of the entire periphery of the thrust needle roller bearing (FIGS. 2A-2E) of the first embodiment described above.

An alignment part 19 for alignment between two cages 13 and 14 includes, for example, a notch (not shown) made in the outer rim of upper cage 13 and a projection (not shown) formed on the outer rim of lower cage 14, and the projection and the notch are engaged with each other so as to prevent displacement of pitches of pockets 15 and 16 of cages 13 and 14 in the caulking process for example. Those partially caulked portions 17 and 18 are arranged at four positions on the periphery with a phase difference of 45° between the caulked portions. In this way, deformation of the cages in the caulking process is reduced. Here, the number of positions where the caulked portions are placed is not limited to four. In terms of the strength, the caulked portions may be arranged at two or more positions (e.g. five to eight positions) at regular intervals. Then, deformation of the cages in the caulking process can be reduced. In other words, the number of partially caulked portions is changed depending on the size of the bearing and conditions in use for example.

Third Embodiment

A thrust needle roller bearing of this embodiment differs from that of the above-described second embodiment only in the direction of the caulking. It is noted that the same or similar components or parts to those of the second embodiment are denoted by like reference characters and detailed description thereof is not repeated here.

Figure 8A:
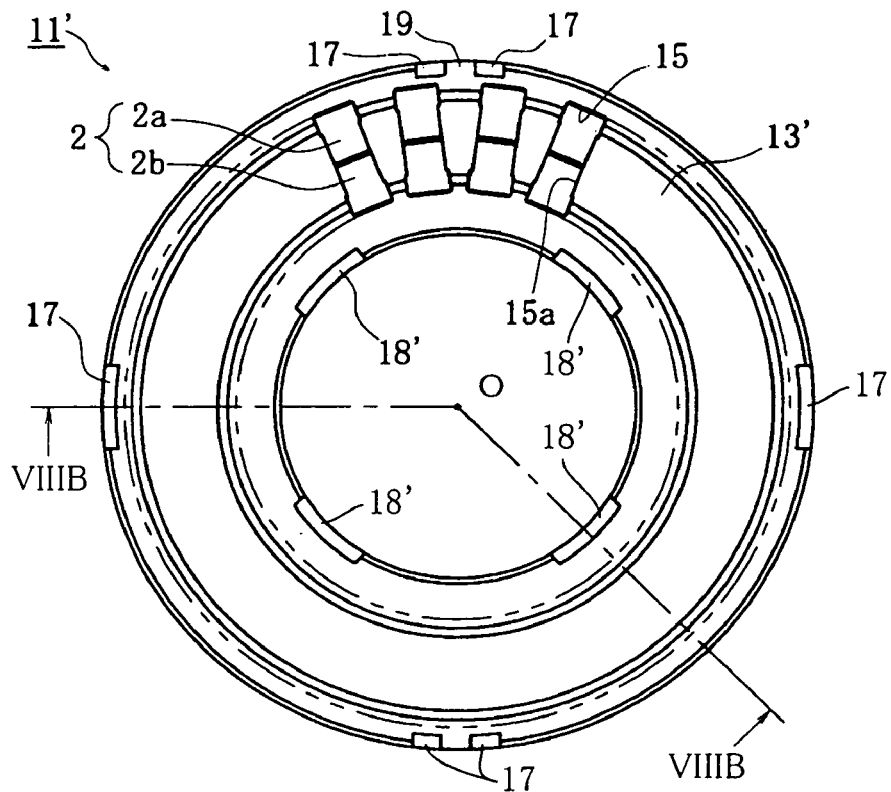
FIG. 8A is a plan view showing a support structure carrying a thrust load of a compressor according to a third embodiment of the present invention.
Figure 8B:
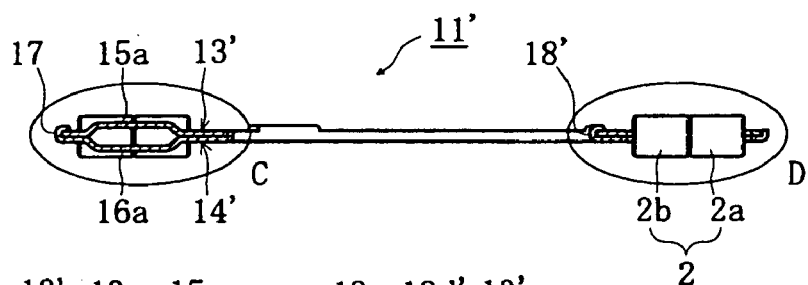
FIG. 8B is a cross-sectional view along line VIIIB-O-VIIIB in FIG. 8A.
Figure 8C:
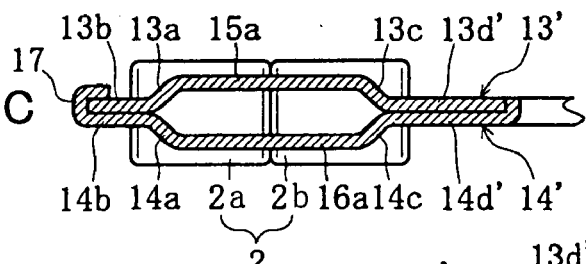
FIG. 8C is an enlarged view of a portion C in FIG. 8B.

Referring to FIGS. 8A-8D, thrust needle roller bearing 11' applied to a support structure which carries a thrust load of a compressor has a plurality of needle rollers 2 and two annular cages 13' and 14' that hold these needle rollers 2 at predetermined pitches in the circumferential direction. Of two cages 13' and 14', upper cage 13' includes a roller holder portion 15a which has its radially outer portion including, as shown in FIG. 8C, a sloping extension 13a formed by bending the outer end of roller holder portion 15a and an outer plate-like portion 13b formed by bending the lower end of sloping extension 13a in the radial direction. Roller holder portion 15a of upper cage 13 also has its radially inner portion including a sloping extension 13c formed by bending the inner end of roller holder portion 15a and an inner plate-like portion 13d' formed by bending the lower end of sloping extension 13c in the radial direction.

Lower cage 14 includes a roller holder portion 16a having its radially outer portion including a sloping extension 14a formed by bending the outer end of roller holder portion 16a and an outer plate-like portion 14b formed by bending the outer end of sloping extension 14a in the radial direction. Roller holder portion 16a of lower cage 14 also has its radially inner portion including a sloping extension 14c formed by bending the inner end of roller holder portion 16a and an inner plate-like portion 14d' formed by bending the inner end of sloping extension 14c in the radial direction.

As shown in FIG. 8C, outer plate-like portions 13b and 14b of two cages 13' and 14' are laid on each other so that they are in contact with each other in the perpendicular direction, and the outermost part of outer plate-like portion 14b is partially bent upward into C-shape to partially caulk outer plate-like portion 14b to outer plate-like portion 13b and thereby form partially caulked portions 17. On the other hand, inner plate-like portions 13d' and 14d' are laid on each other so that they are in contact with each other in the perpendicular direction and the innermost part of inner plate-like portion 14d' is bent upward.

Figure 8D:
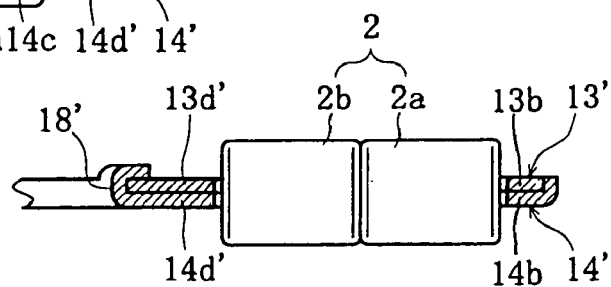
FIG. 8D is an enlarged view of a portion D in FIG. 8B.

Further, as shown in FIG. 8D, inner plate-like portions 13d' and 14d' are laid on each other so that they are in contact with each other in the perpendicular direction and the innermost part of inner plate-like portion 14d' is partially bent upward into C-shape to partially caulk inner plate-like portion 14d' to inner plate-like portion 13d' and thereby form partially caulked portions 18'. On the other hand, outer plate-like portions 13b and 14b are laid on each other so that they are in contact with each other in the perpendicular direction and the outermost part of outer plate-like portion 14b is bent upward.

These partially caulked portions 17 and 18' allow two cages 13' and 14' to firmly be integrated on the inner and outer ends. In addition, the presence of partially caulked portions 17 and 18' on the same plane can further facilitate the caulking process, as compared with the partial caulking of the thrust needle roller bearing of the above-described second embodiment.

Fourth Embodiment

A thrust needle roller bearing of this embodiment differs in structure from those of the above-discussed first to third embodiments only in the means for fixing the two cages. It is noted that the same or similar components or parts to those of the first to third embodiments are denoted by like reference characters and description thereof is not repeated here.

Figure 9A:
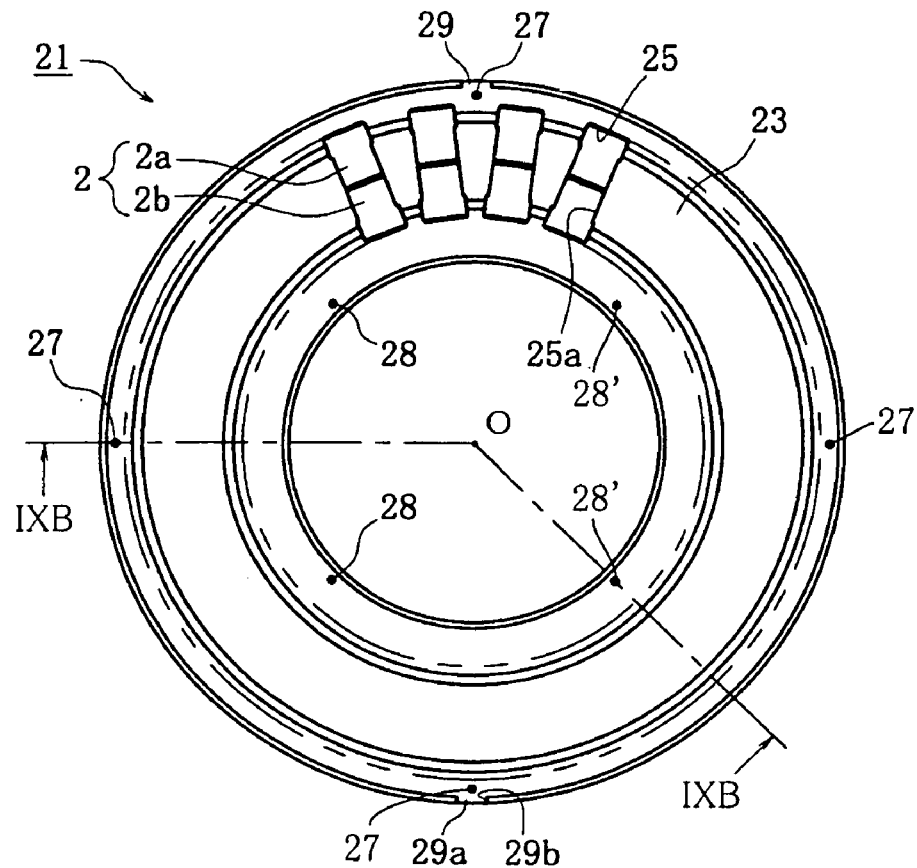
FIG. 9A is a plan view showing a support structure carrying a thrust load of a compressor according to a fourth embodiment of the present invention.
Figure 9B:
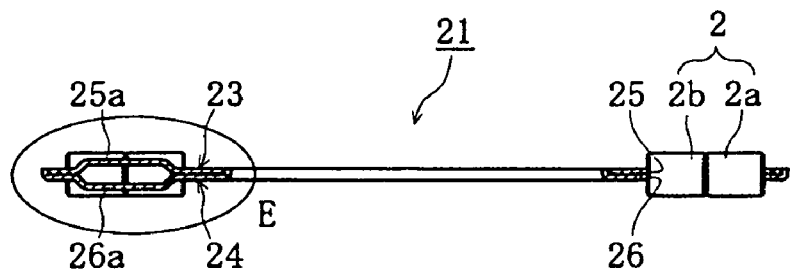
FIG. 9B is a cross-sectional view along line IXB-O-IXB in FIG. 9A
Figure 9C:
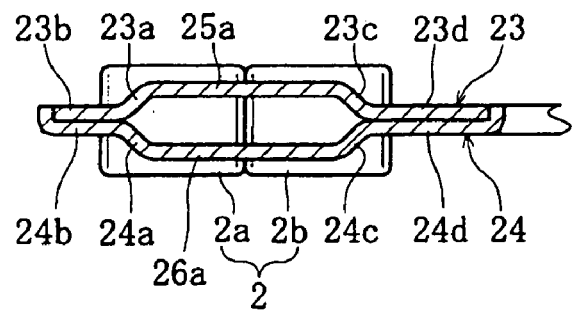
FIG. 9C is an enlarged view of a portion E in FIG. 9B.

Referring to FIGS. 9A-9C, thrust needle roller bearing 21 applied to a support structure which carries a thrust load of a compressor has a plurality of needle rollers 2 and two annular cages 23 and 24 that hold these needle rollers 2 at predetermined pitches in the circumferential direction. Of two cages 23 and 24, upper cage 23 has a roller holder portion 25a with its radially outer portion including a sloping extension 23a formed by bending the outer end of roller holder portion 25a and an outer plate-like portion 23b formed by bending the lower end of sloping extension 23a in the radial direction, as shown in FIG. 9C. The radially inner portion of roller holder portion 25a of upper cage 23 has a sloping extension 23c formed by bending the inner end of roller holder portion 25a and an inner plate-like portion 23d formed by bending the lower end of sloping extension 23c in the radial direction.

Lower cage 24 has its roller holder portion 26a having a radially outer portion including a sloping extension 24a formed by bending the outer end of roller holder portion 26a and an outer plate-like portion 24b formed by bending the outer end of sloping extension 24a in the radial direction. Roller holder portion 26a of lower cage 24 also has its radially inner portion including a sloping extension 24c formed by bending the inner end of roller holder portion 26a and an inner plate-like portion 24d formed by bending the inner end of sloping extension 24c in the radial direction.

As shown in FIG. 9C, outer plate-like portions 23b and 24b of two cages 23 and 24 are laid on each other so that they are in contact with each other in the perpendicular direction and the outermost part of outer plate-like portion 24b is bent upward. On the other hand, inner plate-like portions 23d and 24d are laid on each other so that they are in contact with each other in the perpendicular direction and the innermost part of inner plate-like portion 24d is bent upward. The innermost part of inner plate-like portion 23d may be bent downward. According to this embodiment, the inner periphery and the outer periphery of two cages 23 and 24 are integrally fixed at spot-welded portions 27 and 28 as shown in FIG. 9A. These welded portions 27 and 28 are arranged at four positions at regular intervals in the circumferential direction with a phase difference of 45° between the welded portions. Any deformation of the cages due to the welding is thus reduced. Here, the number of positions where the welding is done is not limited to four. In terms of the strength, at least two (e.g. five to eight) spot-welded positions at regular intervals can reduce the deformation of the cages due to the welding. In other words, the number of positions where the welding is done is changed depending on the size of the bearing and conditions in use.

An alignment part 29 for alignment between two cages 23 and 24 includes a projection 29a formed on the outer rim of upper cage 23 and a notch 29b formed in the outer rim of lower cage 24, and these projection 29a and notch 29b are engaged with each other in order to prevent displacement of phases of pockets 25 and 26 of two cages 23 and 24. The structure of this alignment part 29 is not limited to the above-described one. For example, so-called staking method may be applied according to which the outer rim of lower cage 24 is partially caulked to be engaged with upper cage 23 and accordingly fixed, or engaging by a pin and a hole may be applied.

Figure 10A:
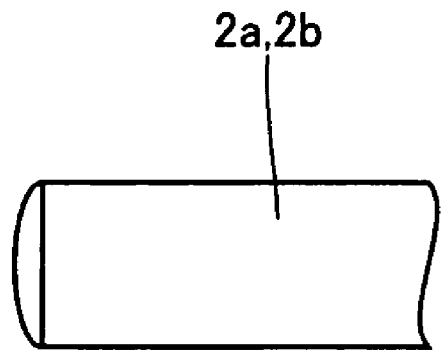
FIGS. 10A and 10B illustrate respective shapes of end surfaces of needle rollers.
Figure 10B:
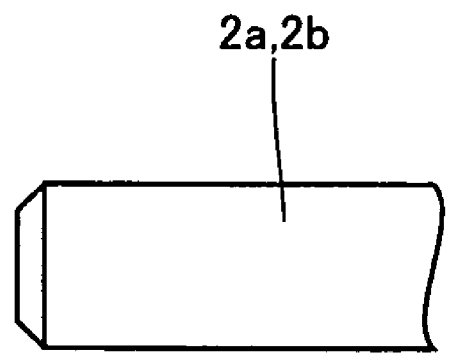

According to the first to fourth embodiments described above, preferably needle rollers 2a and 2b have an end shape represented by symbol "A" (round) defined by JIS (Japanese Industrial Standards) as shown in FIG. 10A, an end shape represented by symbol "F" (flat) defined by JIS as shown in FIG. 10B, or an end shape of a combination of those represented respectively by symbols "A" and "F" defined by JIS. With the end shape represented by "F" (flat) defined by JIS and an end-surface precision of 30 μm or less, frictional resistance between the rollers and the cages and frictional resistance between a roller and an adjacent roller are remarkably reduced. As a result, in particular, drilling wear due to friction caused by impact between these components hardly occurs and the sound of bearing generated when these components impact each other is reduced.

As an example of compressors, the double-swash-plate type compressor is described in connection with the above embodiments. The present invention, however, is not limited to this type of compressor and is applicable, for example, to swash-plate compressors of other types, a scroll compressor and the like. Examples of the swash-plate compressors of other types are a single-swash-plate compressor, a variable-capacity single-swash-plate type compressor.

Figure 11:
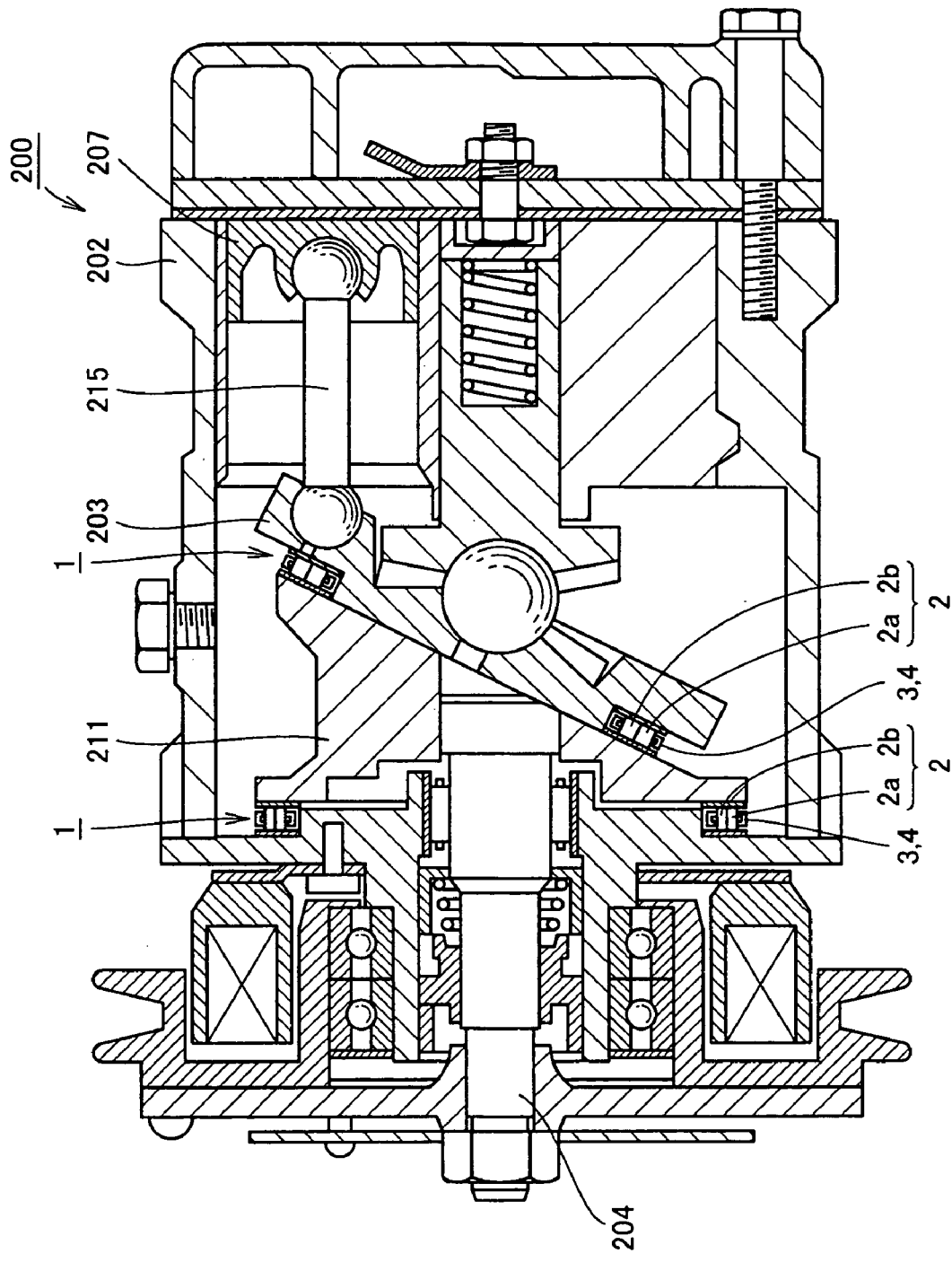
FIG. 11 is a cross-sectional view showing a single-swash-plate type compressor.

As shown in FIG. 11, a single-swash-plate compressor 200 has, in each of the space between a swash plate 203 and a housing 202 and a space between swash plate 203 and a coupling member 211, double-row thrust needle roller bearing 1 serving as a support structure carrying a thrust load of this embodiment. It is noted here that coupling member 211 serves to couple swash plate 203 and a piston 207. In this compressor 200, a main shaft 204 rotates and accordingly swash plate 203 rotates so that coupling member 211 swings to cause piston 207 to reciprocate in a cylinder via a piston rod 215.

Figure 12:
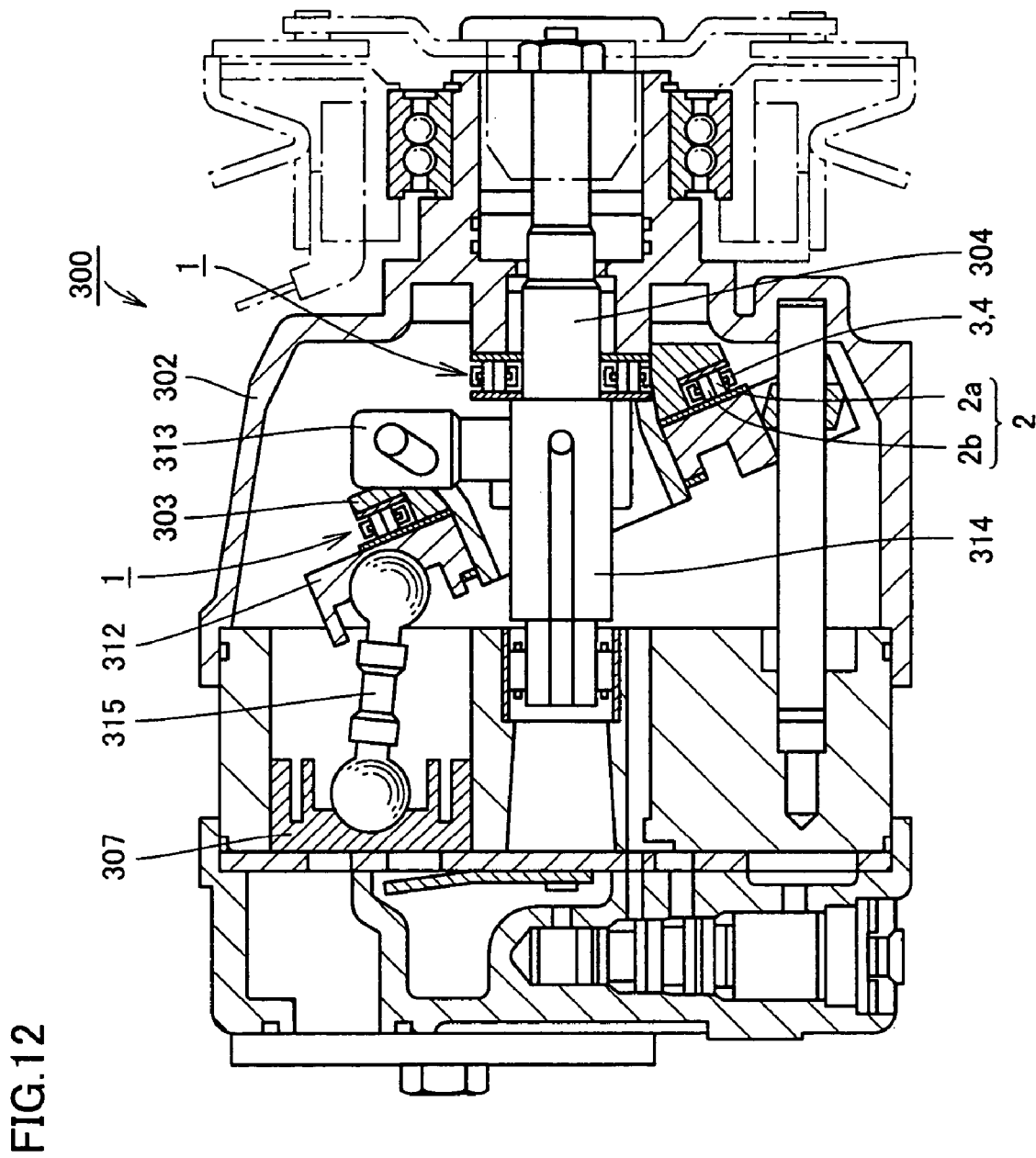
FIG. 12 is a cross-sectional view showing a variable-capacity single-swash-plate type compressor.
Figure 13A:
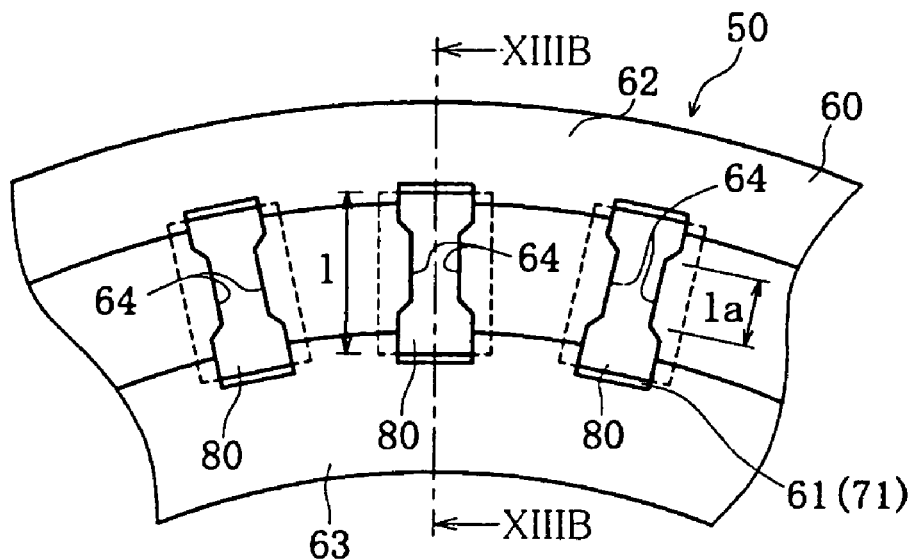
FIG. 13A is a partial plan view showing a conventional thrust needle roller bearing.
Figure 13B:
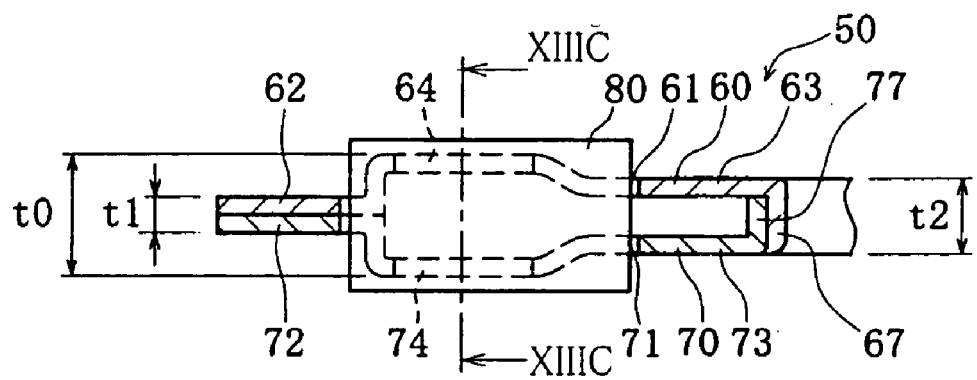
FIG. 13B is a cross-sectional view along line XIIIB-XIIIB in FIG. 13A
Figure 13C:
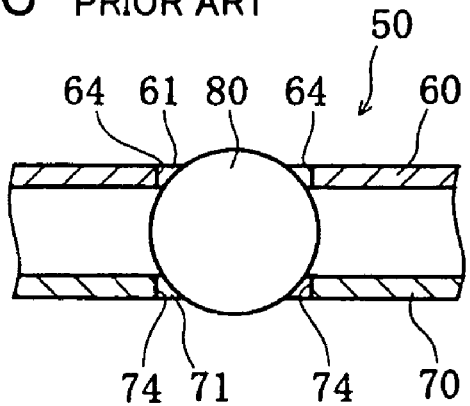
FIG. 13C is a cross-sectional view along line XIIIC-XIIIC in FIG. 13B.

Further, as shown in FIG. 12, a variable-capacity single-swash-plate type compressor 300 has double-row thrust needle roller bearing 1 serving as a support structure carrying a thrust load in this embodiment that is provided between a journal 303 corresponding to a swash plate and a piston support 312. Further, double-row thrust needle bearing 1 serving as the support structure carrying a load in this embodiment is also provided between a housing 302 and a sleeve 314 of a main shaft 304.

In this compressor 300, journal 303 rotates as main shaft 304 rotates, and a piston support 312 swings to cause piston 307 to reciprocate in a cylinder via a piston rod 315. For this compressor, sleeve 314 coupled with a drive pin 313 is slid in the axial direction with respect to main shaft 304 so that the angle of inclination of journal 303 can be changed and thus a variable capacity is implemented.

Although a component which contributes to the compression is described above as the swash plate, the compression-contributing member is not limited to this swash plate.

Further, although the embodiments are described for a compressor of a car air-conditioner, the present invention is applicable to a thrust support structure for use in any of compressors of various types.

As detailed above, regarding the support structure of the present invention that carries a thrust load of a compressor, the thrust needle roller bearing has needle rollers arranged in two rows, so that the length in the radial direction of one needle roller can be shortened as compared with that of a single-row needle roller. Accordingly, the differential slip of the needle rollers can be reduced and thus breakage of an oil film and metal-to-metal contact can be avoided. Then, a reduction of heat generation of the support structure as well as high-speed rotation are achieved. Consequently, any surface damage and surface-originated peeling can be prevented to improve the durability of the bearing. Moreover, as the differential slip can be reduced, the support structure has a low torque and thereby a high energy efficiency can be achieved. In this way, the support structure carrying a thrust load of a compressor can be obtained with an improved strength durability.

Moreover, the inner and outer peripheries of the two cages are caulked to achieve an effect of preventing separation of the cages from each other. In addition, the flat portion having a lower cross-sectional height than that of the roller holders is provided between the caulked portion and respective ends of the needle rollers, so that the outflow of the lubricating oil as well as the inflow thereof can be enhanced. Then, seizure of any part of the bearing can surely be prevented and the drilling wear of the end surfaces of the needle rollers and the pockets of the cages can be reduced. Further, since the cages is less prone to hinder passage of the lubricating oil, the lubricating oil hardly stays and thus any increase of the lubricating oil temperature can be reduced. With the effect of increasing the strength of the two cages that is achieved by fixing both of the outermost end and the innermost end in the radial direction of the two cages, the durability of the compressor can further be improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A support structure carrying a thrust load of a compressor, having a compression-contributing member contributing to a compressing operation by rotating according to rotation of a rotating shaft supported rotatably by a housing,
    wherein said support structure rotatably supports said compression-contributing member with respect to said housing and includes a thrust needle roller bearing having double-row needle rollers;
    wherein the thrust needle roller bearing comprises a plurality of needle rollers and two cages which engage each other to form a cage assembly having roller holder portions to respectively retain the needle rollers;
    wherein one of the two cages has a notch, and the other of the two cages has a projection for engaging the notch to position the two cages with respect to each other;
    wherein one, and only one, of the two cages has a bent inner end and a bent outer end, such that respective end faces of the inner end and the outer end face toward the other of the two cages, and the other of the two cages does not have either a bent inner end or a bent outer end; and
    wherein the two cages are spot-welded together.

2. The support structure according to claim 1, wherein
    said compression-contributing member is a swash plate having an inclined surface with respect to a surface in the direction orthogonal to the axial direction of said rotating shaft.

3. The support structure according to claim 1, wherein
    said two cages are annular, said two cages respectively have a plurality of pockets having a radial length slightly larger than that of said needle rollers, said roller holder portions are formed at said plurality of pockets respectively and are structured to allow said two cages to hold said needle rollers therebetween in the direction from above and below, and said needle rollers are arranged in two rows in each of said plurality of pockets.

4. The support structure according to claim 1, wherein
    one of said double-row needle rollers that is located on the radially outer side has its length which is at least the length of the needle roller located on the radially inner side.

5. A thrust needle roller bearing used for the support structure carrying a thrust load of a compressor as recited in claim 1.

6. A support structure carrying a thrust load of a compressor, having a compression-contributing member contributing to a compressing operation by rotating according to rotation of a rotating shaft supported rotatably by a housing,
    wherein said support structure includes a thrust needle roller bearing having double-row needle rollers between said housing and a sleeve of said rotating shaft;
    wherein the thrust needle roller bearing comprises a plurality of needle rollers and two cages which engage each other to form a cage assembly having roller holder portions to respectively retain the needle rollers;
    wherein one of the two cages has a notch, and the other of the two cages has a projection for engaging the notch to position the two cages with respect to each other;
    wherein one, and only one, of the two cages has a bent inner end and a bent outer end, such that respective end faces of the inner end and the outer end face toward the other of the two cages, and the other of the two cages does not have either a bent inner end or a bent outer end; and
    wherein the two cages are spot-welded together.

7. The support structure according to claim 6, wherein
    said compression-contributing member is a swash plate having an inclined surface with respect to a surface in the direction orthogonal to the axial direction of said rotating shaft.

8. The support structure according to claim 6, wherein
    said two cages are annular, said two cages respectively have a plurality of pockets having a radial length slightly larger than that of said needle rollers, said roller holder portions are formed at said plurality of pockets respectively and are structured to allow said two cages to hold said needle rollers therebetween in the direction from above and below, and said needle rollers are arranged in two rows in each of said plurality of pockets.

9. The support structure according to claim 6, wherein
    one of said double-row needle rollers that is located on the radially outer side has its length which is at least the length of the needle roller located on the radially inner side.

* * * * *